(12) United States Patent
Koshika

(10) Patent No.: US 6,404,623 B1
(45) Date of Patent: Jun. 11, 2002

(54) PORTABLE ELECTRONIC APPARATUS

(75) Inventor: Fumihito Koshika, Kawashi (JP)

(73) Assignee: Fujitsu Limited, Kawasaki (JP)

( * ) Notice: Subject to any disclaimer, the term of this patent is extended or adjusted under 35 U.S.C. 154(b) by 80 days.

(21) Appl. No.: 09/605,082

(22) Filed: Jun. 27, 2000

(30) Foreign Application Priority Data

Oct. 19, 1999 (JP) .......................................... 11-297400

(51) Int. Cl.[7] ................................................. G06F 1/16
(52) U.S. Cl. ........................ 361/681; 361/683; 361/687; 345/87; 364/708.1
(58) Field of Search .................................. 361/681, 683, 361/687, 680, 685; 364/707, 708.1, 709.11, 710.12; 395/2.1, 2.79, 2.81, 2.86, 2.85, 2.87; 381/51, 36; 369/24–29, 83; 379/75; 320/2, 43–44, 48, 636; 324/425, 426, 427, 435

(56) References Cited

U.S. PATENT DOCUMENTS

| | | | |
|---|---|---|---|
| 5,410,497 A | 4/1995 | Viletto | 364/708.1 |
| 5,475,626 A | 12/1995 | Viletto | 364/708.1 |
| 5,477,129 A * | 12/1995 | Myslinski | 320/48 |
| 5,481,645 A * | 1/1996 | Bertino et al. | 395/2.79 |

FOREIGN PATENT DOCUMENTS

| | | | | |
|---|---|---|---|---|
| EP | 0 562 723 | 9/1993 | | |
| EP | 0 564 092 | 10/1993 | | |
| EP | 0 697 644 | 2/1996 | | |
| EP | 0 886 204 | 12/1998 | | |
| JP | 6-12144 | 1/1994 | | |
| JP | 6-43966 | 2/1994 | | |
| JP | 408161079 A | * | 6/1996 | G06F/1/16 |
| JP | 9-26832 | | 1/1997 | |
| JP | 410049266 A | * | 2/1998 | G06F/1/32 |
| JP | 410123969 A | * | 5/1998 | G09F/9/00 |
| JP | 11-119875 | | 4/1999 | |
| JP | 02000056910 A | * | 2/2000 | G06F/3/02 |

\* cited by examiner

Primary Examiner—Leo P. Picard
Assistant Examiner—Michael Datskovsky
(74) Attorney, Agent, or Firm—Armstrong, Westerman, Hattori, McLeland & Naughton, LLP

(57) ABSTRACT

A portable electronic apparatus includes a main unit, a cover rotatably attached to the main unit, the cover having a main display unit, an auxiliary display unit displaying auxiliary information provided on the main unit, and an angle changing mechanism for changing an angle at which a surface of the auxiliary display unit intersects a surface of the main unit at least when the cover is in an open state. By providing the auxiliary display unit on the main unit instead of the cover the main display unit provided on the cover can be made as large as possible. In addition, being able to change the angle of the surface of the auxiliary display unit makes the auxiliary display unit easier to read.

11 Claims, 19 Drawing Sheets

X1 ←——→ X2

X1 ←——→ X2

PORTABLE ELECTRONIC APPARATUS

BACKGROUND OF THE INVENTION

1. Field of the Invention

The present invention relates generally to a portable electronic apparatus, and more particularly, to a portable electronic apparatus having an auxiliary display unit.

2. Description of the Related Art

A portable electronic apparatus comprising a main unit and a display unit provided on a lid-like cover member (hereinafter main display unit) rotatably attached to the main unit is a commonly known configuration embodied in, for example, a typical laptop-type personal computer (hereinafter laptop-type PC).

The main display unit, which may comprise for example a liquid crystal display, or LCD, displays an initial screen at start-up and a variety of other screens upon input. However, in addition to this information displayed on the main display unit LCD, it is also useful for the operator of the portable electronic apparatus to obtain information, hereinafter referred to generally as auxiliary information, concerning the state of the charge of the battery, the capacity of any auxiliary memory device attached to the portable electronic apparatus, and so forth.

The format in which such auxiliary information is displayed can be divided into two main types.

One type of format consists of displaying such auxiliary information in a corner of the main display unit LCD. The advantage of this format is that a separate LCD is not needed in order to display the auxiliary information. On the other hand, however, the operator must take the trouble to operate a specific software application in order to initiate the auxiliary information display function. An additional disadvantage is that operating system initialization after power is supplied must be completed before such auxiliary information software can be run, which means that auxiliary information alone is unobtainable without supplying power to the entire apparatus.

Accordingly, recent developments in the field have led to a second frequently used alternative display format, in which the auxiliary information is displayed on an auxiliary display unit separate from the main display unit LCD, for example, a sub LCD.

The conventional method for providing the sub LCD on the PC main unit involves recessing the sub LCD in the main unit surface so that the sub LCD is not damaged when the lid-like cover is closed. In this position, however, the sub LCD is difficult for the operator to read unless the operator is positioned directly above the sub LCD. In particular, because the LCD has in the past been made from relatively fragile material it has been enclosed in a framed interior enclosure that tends to conceal the front edge of the sub LCD from the operator's view. It is also obvious that in such an arrangement the operator cannot view auxiliary information via the sub LCD with the cover closed.

As an apparatus that provides both a sub LCD that is easily viewed and the capability to view auxiliary information with the cover of the PC closed, a device like that described in Japanese Laid-Open Patent Application No. 9-26832 and shown in FIG. 1 has been proposed. FIG. 1 is a diagram showing one example of the conventional art.

As shown in the diagram, a device (a PC) 1 has an input unit (a keyboard) 2 provided on a main unit 3, the main unit 3 mounting the keyboard 2. The PC 1 further has a cover 4 rotatably mounted on the main unit 3, with a larger main LCD 5 provided on the cover and a smaller sub LCD 6 provided on the main unit 3 together with the keyboard. As can be appreciated, in such an arrangement the sub LCD 6 can be seen even with the main LCD 5 closed, that is, with the cover 4 of the PC 1 closed. The sub LCD together with a sub CPU that controls the sub LCD are able to display information even in a state in which the main LCD 5 and a main CPU that controls the main LCD 5 are turned off.

Separately, a device like that described in Japanese Laid-Open Patent Application No. 6-12144 and shown in FIG. 2 has also been proposed. FIG. 1 is a diagram showing one example of the conventional art.

FIG. 2 is a diagram showing another example of the conventional art. As shown in the diagram, the device, or PC, 1 has a main unit 3 and a cover rotatably attached to the main unit 4. The main unit includes a variety of electronic components and mounts an input unit, or keyboard, 2. A main LCD 5 display screen is mounted on the cover 4. The cover 4 swings open to allow access to the input unit 2 and permit viewing of the main LCD 5. A sub LCD, or function indicator, 6 is provided on the main unit 3 in a raised position to permit ease of viewing and displays a variety of operating states using a variety of characters and symbols. A portion of the cover 4 is removed in order to create a zone of visibility 7, such that the sub LCD 6 can be viewed even with the cover closed 4.

It should be noted that Japanese Laid-Open Patent Application No. 6-12144 claims priority from Italian Patent No. T092A000208, with U.S. Pat. No. 5,410,497 and European Patent No. 564092, claiming priority from Italian Patent No. TO92000208. In addition, there is Japanese Laid-Open Patent Application No. 11-119875, which is related to Japanese Laid-Open Patent Application No. 6-12144 and which concerns a battery gauge display function, claiming priority from U.S. Pat. No. 879,911, and similarly, there is European Patent Application No. 886204, also claiming priority from U.S. patent application Ser. No. 879911.

Additionally, both European Patent No. 886204 as well as Japanese Laid-Open Patent Application No. 6-43966, the latter claiming priority from Italian Patent No. TO92U000062 and submitted by the same applicant who submitted Japanese Laid-Open Patent Application No. 6-12144, describe a structure similar to that of Japanese Laid-Open Patent Application No. 6-12144 although the object of the invention is different.

However, the conventional examples described above have disadvantages.

The arrangement described in Japanese Laid-Open Patent Application No. 9-26832 and shown in FIG. 1, for example, requires that the size of the main unit 3 be increased over the size of the cover 4 by an amount needed to accommodate the sub LCD 6, which is undesirable because the unit becomes heavier, bulkier and thus less portable.

Additionally, as shown in FIG. 2, Japanese Laid-Open Patent Application No. 6-12144 and Japanese Laid-Open Patent Application No. 11-119875 place the zone of visibility 7 on the cover 4. As a result, the size of the main LCD 5 is limited.

SUMMARY OF THE INVENTION

Accordingly, it is a general object of the present invention to provide an improved and useful portable electronic apparatus in which the above-described disadvantages are eliminated.

Another, further and more specific object of the present invention is to provide an improved and useful portable electronic apparatus in which the provision of an auxiliary display unit does not require an increase in the size of the apparatus and hence does not sacrifice the portability of the apparatus.

Still another, further and more specific object of the present invention is to provide an improved and useful portable electronic apparatus in which the size of the main LCD is maximized because no window is formed for the purpose of viewing the auxiliary display unit.

Yet another, further and more specific object of the present invention is to provide an improved and useful portable electronic apparatus in which the auxiliary display unit has superior visibility.

The above-described objects of the present invention are achieved by a portable electronic apparatus comprising:

a main unit;

a cover rotatably attached to the main unit, the cover having a main display unit;

an auxiliary display unit provided on the main unit; and an angle changing mechanism for changing an angle at which a surface of the auxiliary display unit intersects a surface of the main unit at least when the cover is in an open state.

According to the invention described above, a portable electronic apparatus can be provided that does not require a window for viewing the auxiliary display unit and thus allows the size of the main LCD to be maximized, while at the same time providing an auxiliary display unit which can be read easily and accurately.

Other objects, features and advantages of the present invention will become more apparent from the following detailed description when read in conjunction with the accompanying drawings.

DESCRIPTION OF THE PREFERRED EMBODIMENTS

Figure 1:
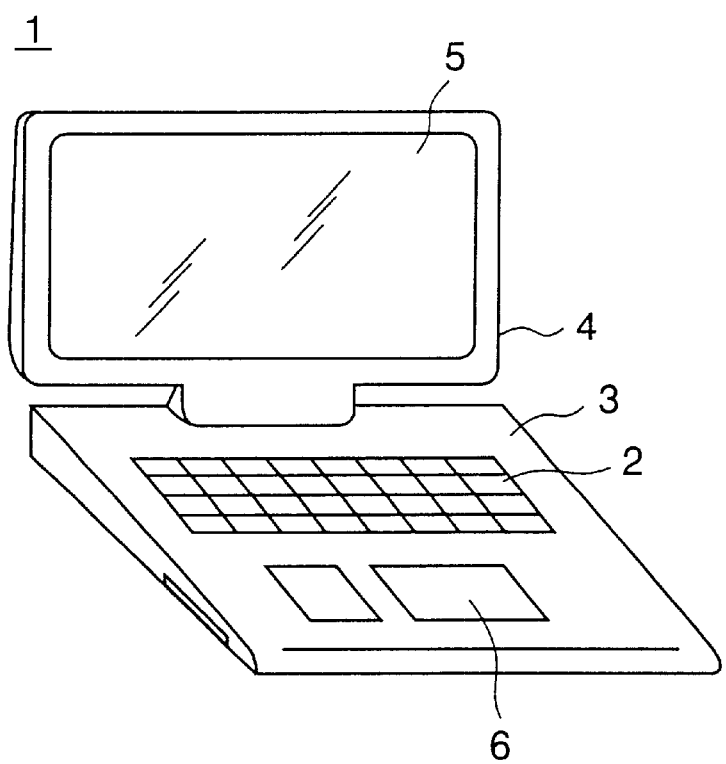
FIG. 1 is a diagram for the purpose of explaining an example of the conventional art, showing a perspective view of a portable electronic apparatus with the cover open and with the cover closed.
Figure 1:
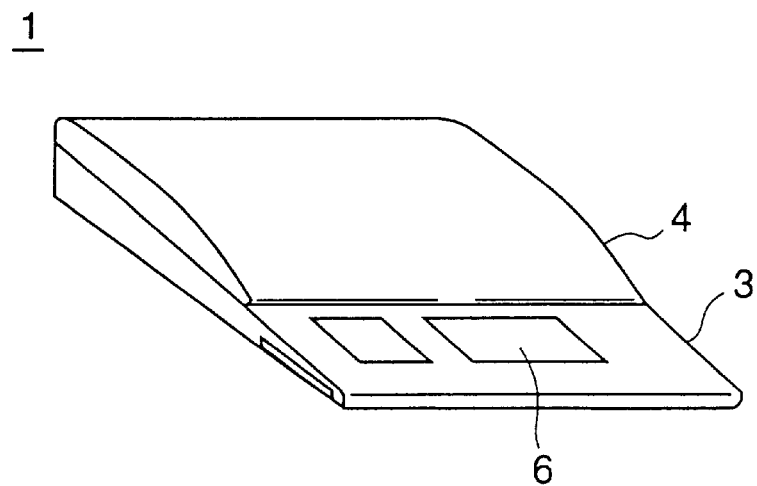
Figure 2:
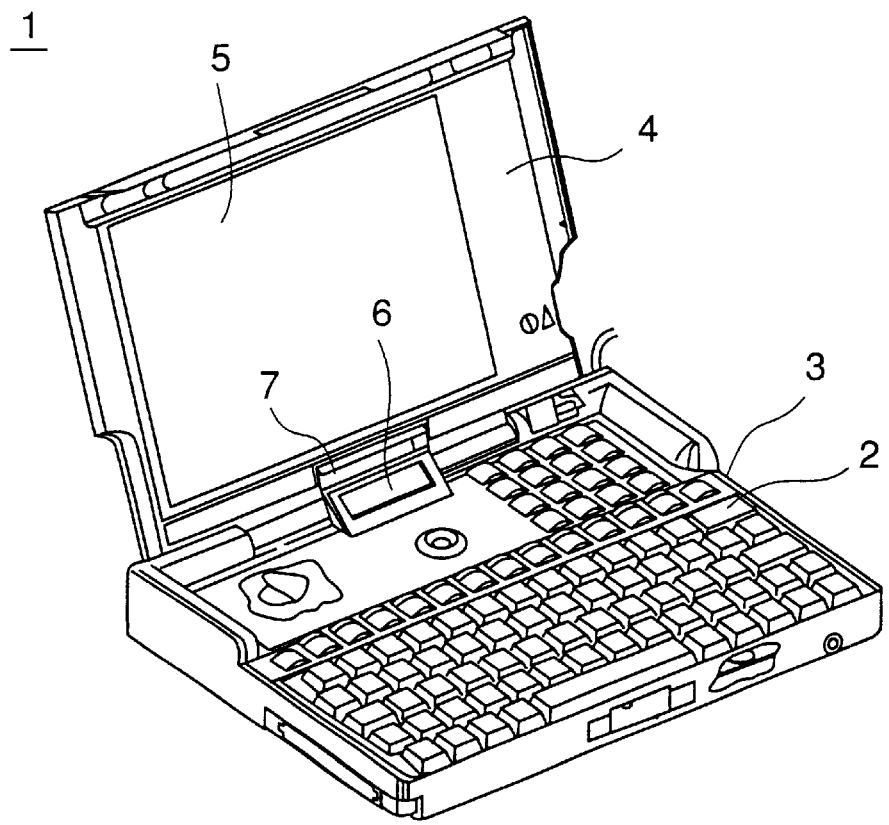
FIG. 2 is a diagram for the purpose of explaining another example of the conventional art, showing a perspective view of a portable electronic apparatus with the cover open and with the cover closed.
Figure 2:
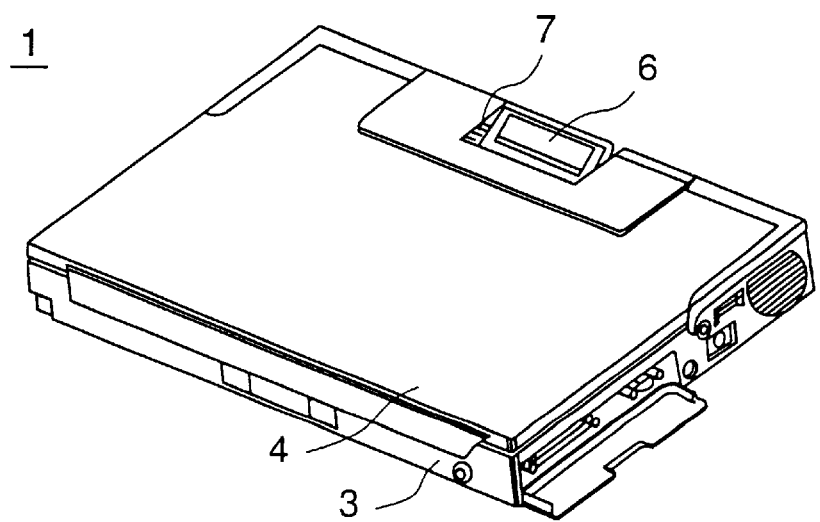

A description will now be given of embodiments of the present invention, with reference to the accompanying drawings.

It should be noted that identical or corresponding elements in the embodiments are given identical or corresponding reference numbers in all drawings, and detailed descriptions thereof are omitted. For ease of explanation, directions in the drawings are given as X1 for a side nearest to an operator of the apparatus, X2 for a side farthest from the operator, Y1 for a left side of the apparatus and Y2 for a right side.

A description will now be given of a portable electronic apparatus according to a first embodiment of the present invention, with reference to FIGS. 3, 4, 5A, 5B, 6 and 7.

Figure 3:
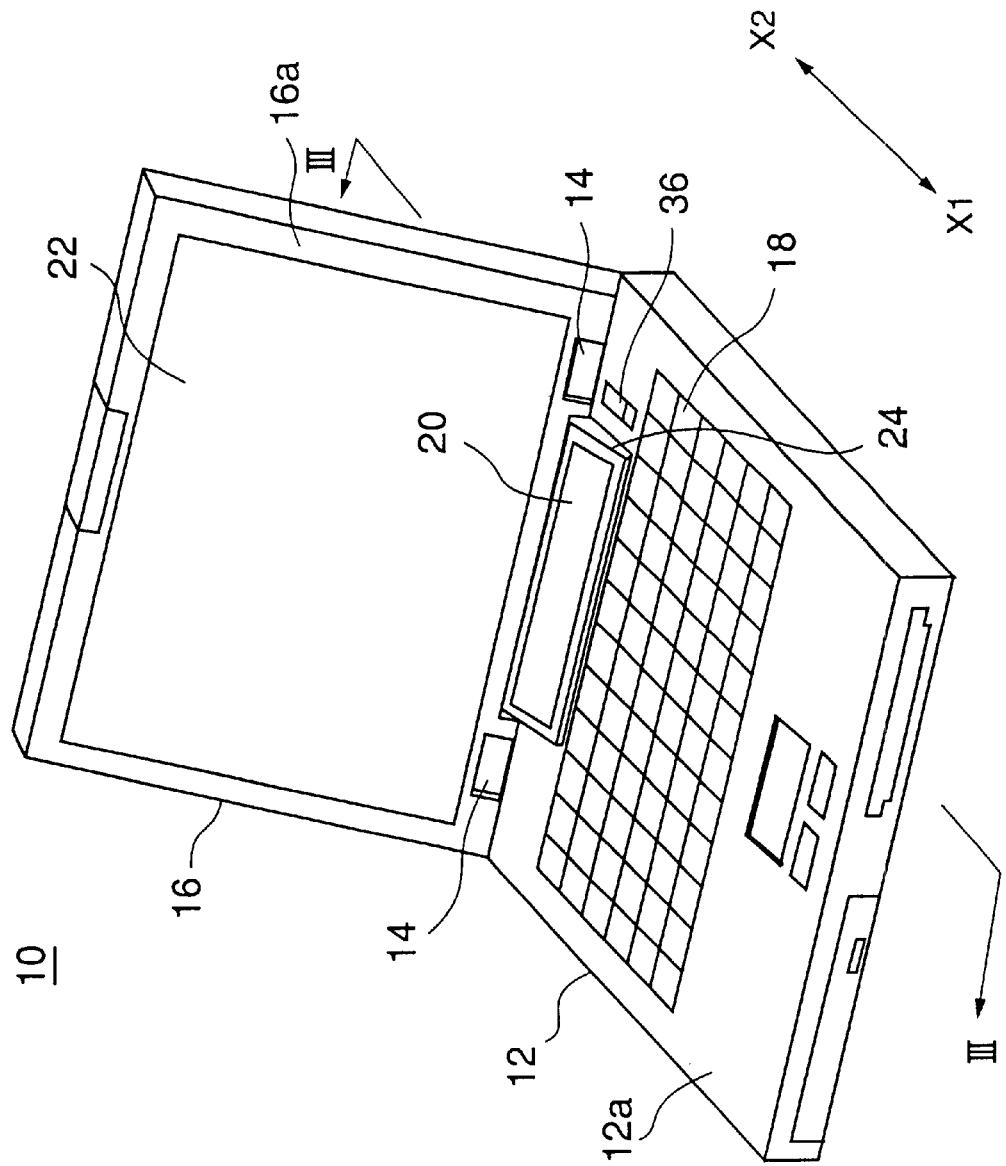
FIG. 3 is a diagram showing a perspective view of a portable electronic apparatus according to a first embodiment of the present invention, with the sub LCD in a raised position.
Figure 4:
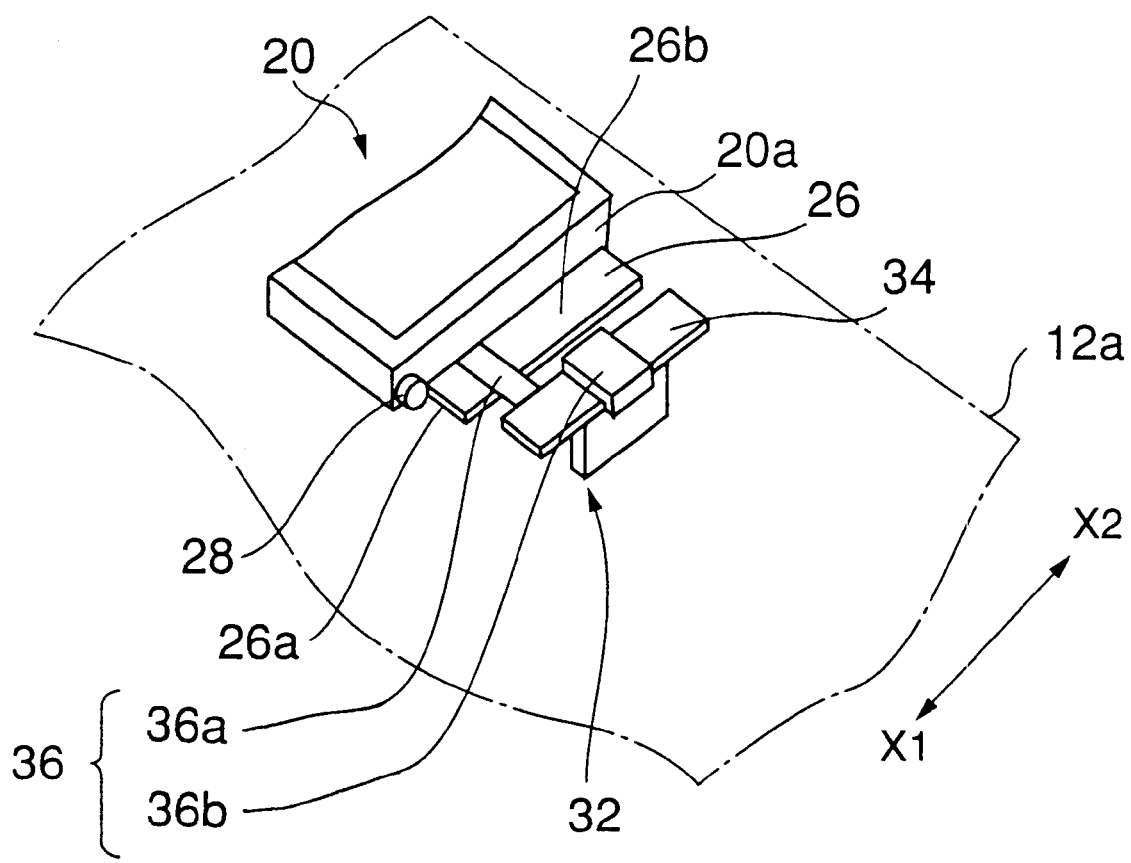
FIG. 4 is a diagram showing a perspective view of an angle changing member of the sub LCD of a portable electronic apparatus according to a first embodiment of the present invention.
Figure 5A:
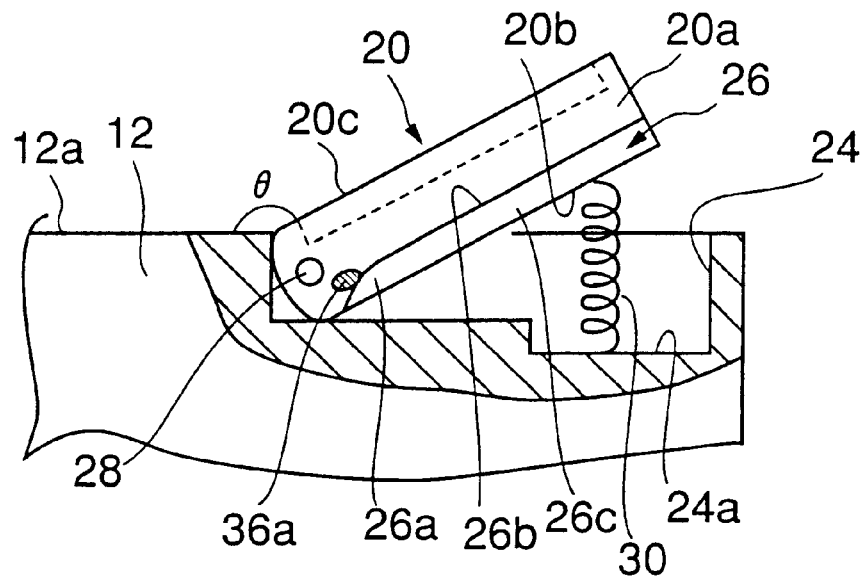
FIGS. 5A and 5B are diagrams showing cross-sectional views of a portable electronic apparatus according to a first embodiment of the present invention along the line III—III of FIG. 3, with the sub LCD in a raised state and in a state in which the sub LCD is stored in a compartment in the main unit.
Figure 5B:
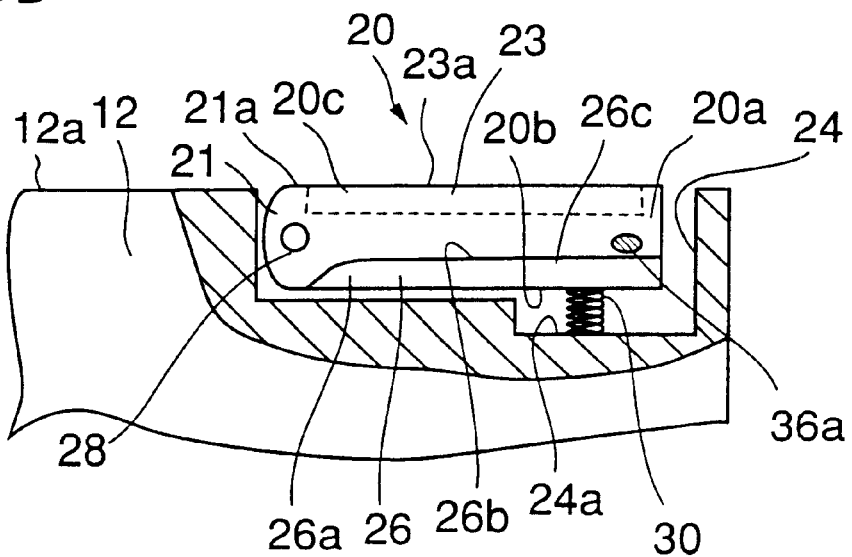
Figure 6:
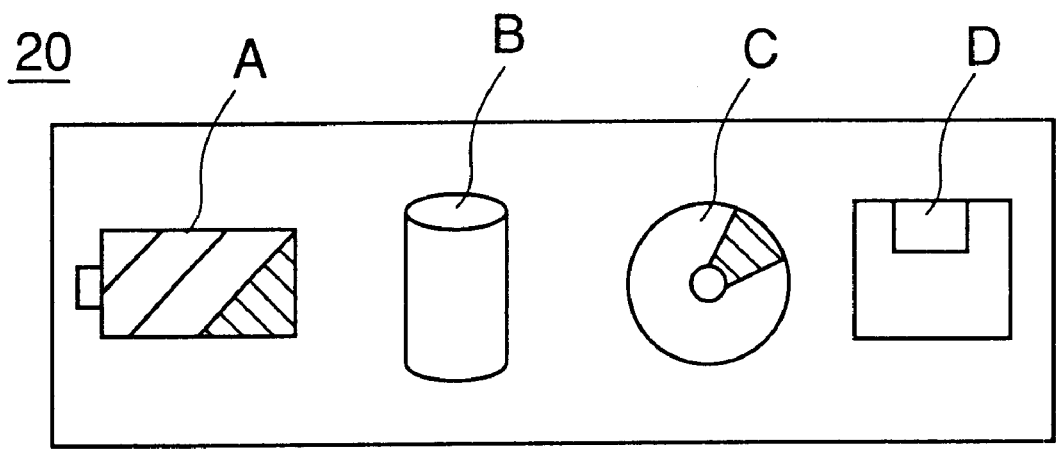
FIG. 6 is a diagram showing a sample of a sub LCD display screen according to a first embodiment of the present invention.
Figure 7:
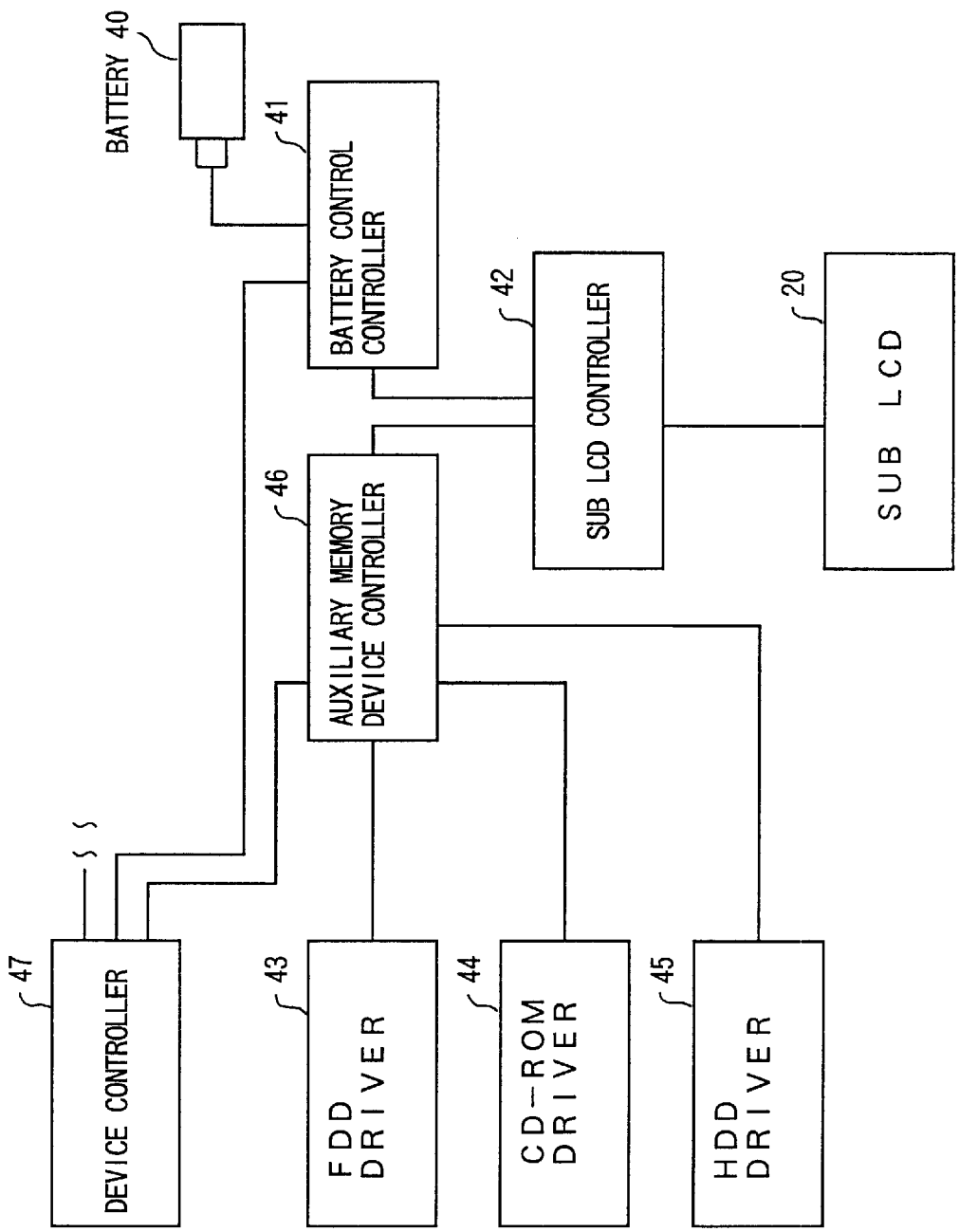
FIG. 7 is a schematic diagram of the circuitry of the sub LCD of a portable electronic apparatus according to a first embodiment of the present invention.

FIG. 3 is a diagram showing a perspective view of a portable electronic apparatus according to a first embodiment of the present invention, with the sub LCD in a raised position. FIG. 4 is a diagram showing a perspective view of an angle changing member of the sub LCD of a portable electronic apparatus according to a first embodiment of the present invention. FIGS. 5A and 5B are diagrams showing cross-sectional views of a portable electronic apparatus according to a first embodiment of the present invention along the line III—III of FIG. 3, with the sub LCD in a raised state and in a state in which the sub LCD is stored within a compartment in the main unit. FIG. 6 is a diagram showing a sample of a sub LCD display screen according to a first embodiment of the present invention. FIG. 7 is a schematic diagram of the circuitry of the sub LCD of a portable electronic apparatus according to a first embodiment of the present invention.

As shown for example in the perspective view of FIG. 3, the portable electronic apparatus 10 comprises a main unit 12 and a cover 16 rotatably connected to the main unit 12 by a hinge member 14.

An operating unit comprising a keyboard 18 as an input unit is provided on a top surface 12a of the main unit 12. Additionally, a substantially rectangular auxiliary display unit is provided as a sub LCD 20 on an X2 side of the top surface 12a of the main unit 12, at an edge of the side at which the cover 16 is connected to the main unit 12. For convenience a detailed description of the sub LCD 20 will be deferred until later.

Further, a larger, main LCD 22 is provided as a main display unit on the cover 16. An initial screen is displayed on this main LCD 22 after power to the main unit is turned on, with text and graphics displayed according to input. In this case, because nothing other than the hinge member 14 is provided on a front surface 16a of the cover 16, the main LCD 22 can be provided across virtually the entire front surface 16a of the cover 16. The increased size of the main LCD 22 screen has the advantage of affording an increase in the amount of information that can be displayed and in the size of the font of the text, for easier readability.

Additionally, as shown in FIGS. 5A and 5B, a concavity, that is, a compartment 24, for containing the sub LCD 20 is provided in the main unit 12. For convenience of explanation only an engaging portion 36a of a slide portion 36 to be described in detail later is shown in FIGS. 5A and 5B.

As shown in FIGS. 5A and 5B and as can be seen in FIG. 4, in which the sub LCD 20 is viewed as if the main unit 12 were transparent, one side 20a of the sub LCD 20 is provided with a flat tab 26 projecting outward from the sub LCD 20 and engaging the engaging portion 36a to be described later. An edge of the flat tab 26 on the X1 side thereof is tapered to a wedge-like shape of reduced thickness at one end 26a while retaining a uniform thickness at the other, X2 side end 26c. A shaft 28 penetrating the compartment 24 on the X1 side of the sub LCD 20 engages and maintains the sub LCD 20 in place. At the same time, a coil spring 30, which corresponds to the urging member of the claims, is provided as an elastic member between a bottom surface 20b of the sub LCD 20 and a floor 24a of the compartment 24, in such a way as to urge the sub LCD 20 upward and outward from an interior of the compartment 24.

A slide member 32 is provided adjacent to the sub LCD 20. The slide member 32 comprises a guide portion 34 provided parallel to the flat tab 26 and a slide portion 36 that straddles and slides along the guide portion 34. The slide portion 36 has an engaging portion 36a that engages a top surface 26b of the flat tab 26 and an operating projection 36b.

The shaft 28, the coil spring 30 and the slide member 32 described above together form the angle changing mechanism described in the claims.

A description will now be given of the operation of the sub LCD 20 angle changing mechanism of the portable electronic apparatus 10 according to a first embodiment of the present invention, with reference in the first instance to a case in which the cover 16 is open so as to permit use of the portable electronic apparatus 10.

In a state in which the cover 16 is open, the sub LCD 20 is stored within the compartment 24 of the main unit 12, with a top surface 20c of the sub LCD 20 essentially flush with the top surface 12a of the main unit 12. It should be noted that, in this case, the sub LCD 20, which includes a reinforcing member, is mounted in such a way that a top surface 23a of the display unit 23 is essentially flush with a top edge 21a of a frame 21 as shown in FIG. 5B. The advantage of such a construction is that no part of the top surface 23a of the display unit 23, that is, no part of the screen of the display unit 23, is hidden from view by the frame 21.

If in this state the operating projection 36b of the slide member 32 is pulled forward in the X1 direction, then the engaging portion 36a slides forward in the X1 direction along the top surface 26b of the flat tab 26 and the engaging portion 36a moves horizontally from the end of uniform thickness 26c of the flat tab 26 to the wedge-like end 26a where the engaging portion 36a leaves the flat tab 26, thus releasing the pressure of the engaging portion 36a on the flat tab 26. Then the sub LCD 20, a bottom edge of which is rotatably supported in place by the shaft 28, is urged upward by the coil spring 30 so as to rotate about the shaft 28 so that the top surface 23a of the display unit 23 forms a predetermined angle (shown as θ in FIG. 5A) with the surface 12a of the main unit 12. In other words, the sub LCD 20 is tilted upward from a position in which it is stored within the main unit 12 to a raised position with respect to the main unit 12.

As a result, the sub LCD 20 is positioned so as to be easily and accurately read by an operator. In this case in particular, the sub LCD 20 is positioned near the main LCD 22, so the operator does not have to change position greatly in order to read the sub LCD 20.

Next, a description will be given of the portable electronic apparatus 10 in which the cover is to be closed after usage of the apparatus 10.

In this case, by pushing the operating projection 36b of the slide member 36 toward the rear or X2 direction, the engaging portion 36a slides horizontally along the top surface 26b of the flat tab 26 from the wedge-like end 26a to the end of uniform thickness 26c of the flat tab 26, with the engaging portion 36a pressing the flat tab 26. The sub LCD 20 together with the coil spring 30 is then stored completely within the compartment 24, with the result that the sub LCD 20 does not remain as an obstruction on the surface 12a of the main unit 12 and the cover 16 can thus be closed.

FIG. 6 is a diagram showing a sample of a sub LCD display screen according to a first embodiment of the present invention, in which, for example, four sample icons are shown indicating the state of operation of the apparatus 10. Reference letter A indicates the remaining charge on a battery 40 that is the source of power for the apparatus, such that as the charge remaining on the battery 40 declines the colored area decreases. Such an indication permits the operator to judge the amount of available time for continuous use of the portable electronic apparatus 10, determine when the battery 40 needs to be recharged and ascertain the state of the recharge of the battery 40.

The icon shown by reference letter B indicates whether or not an HDD as an auxiliary memory device (not shown in the diagram) is loaded, and flashes when the HDD is loaded in the portable electronic apparatus 10. As a result, the operator can determine at a glance whether or not an HDD has been loaded without the need to check the HDD mount directly, thus, for example, helping to prevent the operator from forgetting to remove the HDD.

Similarly, reference letters C and D indicate whether or not other auxiliary memory devices such as a CD-ROM or a floppy disk, respectively, have been loaded FIG. 7 is a schematic diagram of the circuitry of the above-described sub LCD 20 of the portable electronic apparatus 10 according to a first embodiment of the present invention.

A signal that indicates a remaining charge on the battery 40 is sent from a battery controller 41 to the sub LCD controller 42 and the sub LCD 20 signal A display is displayed by the sub LCD controller 42. Additionally, the signals that indicate whether or not a floppy disk drive, a CD-ROM or an HDD is loaded are sent from the floppy disk driver 43, the CD-ROM driver 44 and the HDD driver 45, respectively, to the auxiliary memory device controller 46 and the sub LCD signals B, C and D are displayed by the auxiliary memory device controller 46. It should be noted that the battery controller 41 and the auxiliary memory device controller 46 are themselves controlled by the device controller 47, which controls the entire apparatus 10 as a whole.

In such a circuit structure as described above, the sub LCD 20 shows a predetermined display. Additionally, the structure is such that the sub LCD 20 display circuit operates independently of the main circuitry of the apparatus 10, so, as will be described later, the sub LCD 20 can supply the operator with auxiliary information even with the power to the apparatus 10 off and the cover 16 closed.

A description will now be given of a portable electronic apparatus according to a second embodiment of the present invention, with reference to the accompanying drawings.

Figure 8:
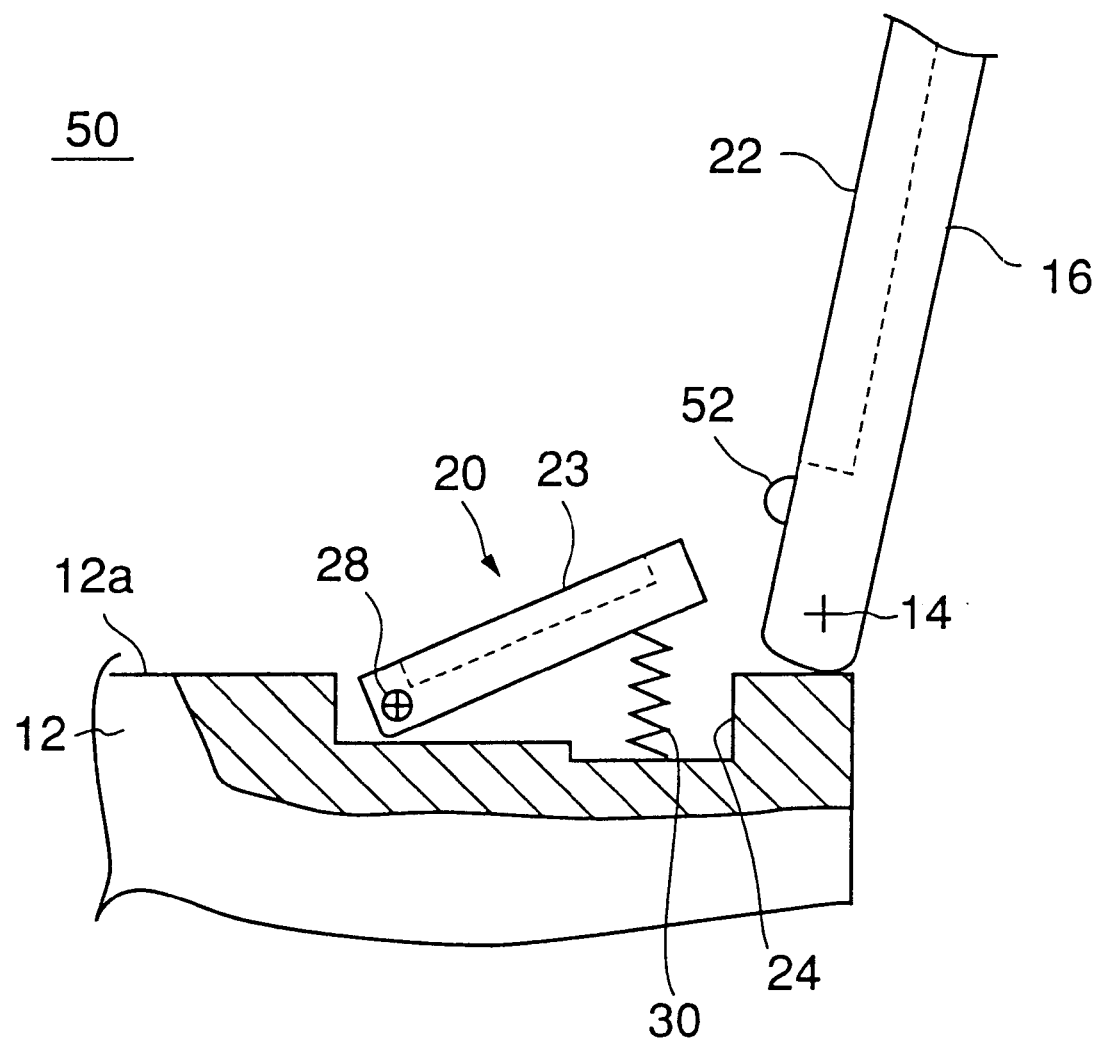
FIG. 8 is a diagram showing a partial cross-sectional view of a portable electronic apparatus according to a second embodiment of the present invention, with the sub LCD in a raised position.
Figure 9:
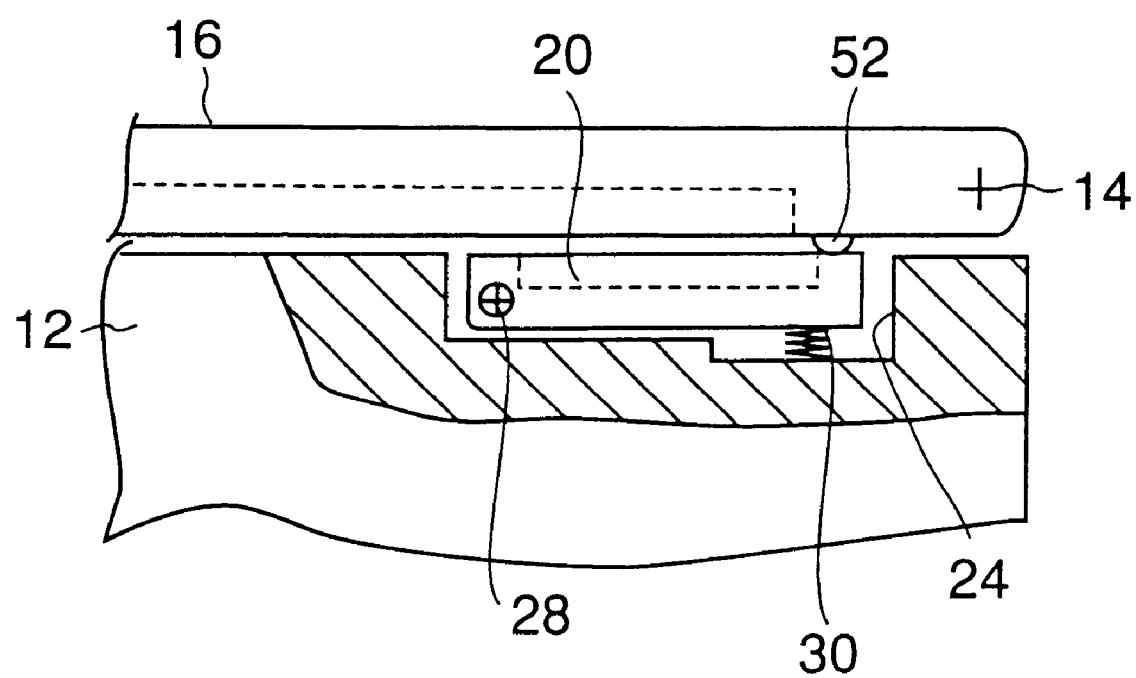
FIG. 9 is a diagram showing a partial cross-sectional view of a portable electronic apparatus according to a second embodiment of the present invention, with the sub LCD in a lowered position.

FIG. 8 is a diagram showing a partial cross-sectional view of a portable electronic apparatus 50 according to a second embodiment of the present invention, with the sub LCD 20 in a raised position. FIG. 9 is a diagram showing a partial cross-sectional view of a portable electronic apparatus 50 according to a second embodiment of the present invention, with the sub LCD 20 in a lowered position.

As can be appreciated from the diagrams, the portable electronic apparatus 50 according to a second embodiment is substantially similar to the portable electronic apparatus 10. However, unlike the apparatus 10 of the first embodiment, the apparatus 50 of a second embodiment has a projection 52 provided on a corner of a central part of a bottom edge of the cover 16 instead of the slide member 32. It should be noted that the projection 52 does not reduce or restrict the size of the main LCD 22.

In such a structure as that of the portable electronic apparatus 50 described above, the shaft 28, coil spring 30 and projection 52 together form the angle changing mechanism as described in the claims.

A description will now be given of the operation of the sub LCD 20 angle changing mechanism of the portable electronic apparatus 50 according to a second embodiment of the present invention as described above.

In the process of opening the cover 16 of the portable electronic apparatus 50 as shown in FIG. 8, the sub LCD 20 is urged by the coil spring 30 so as to rotate upward about the shaft 28, thereby raising the sub LCD 20 to a position from which it can be easily and accurately read by the operator.

In the process of closing the cover 16 of the portable electronic apparatus 50 as shown in FIG. 9, the projection 52 presses down on the sub LCD 20 and the sub LCD 20 and the coil spring 30 are stored within the compartment 24.

An advantage provided by the portable electronic apparatus 50 according to a second embodiment of the present invention is that the structure of the angle changing mechanism can be made relatively simple, such that the same effect provided by the first embodiment can be achieved simply by opening and closing the cover 16.

A description will now be given of a portable electronic apparatus according to a third embodiment of the present invention, with reference to the accompanying drawings, specifically FIGS. 10, 11, 12, 13A and 13B.

Figure 10:
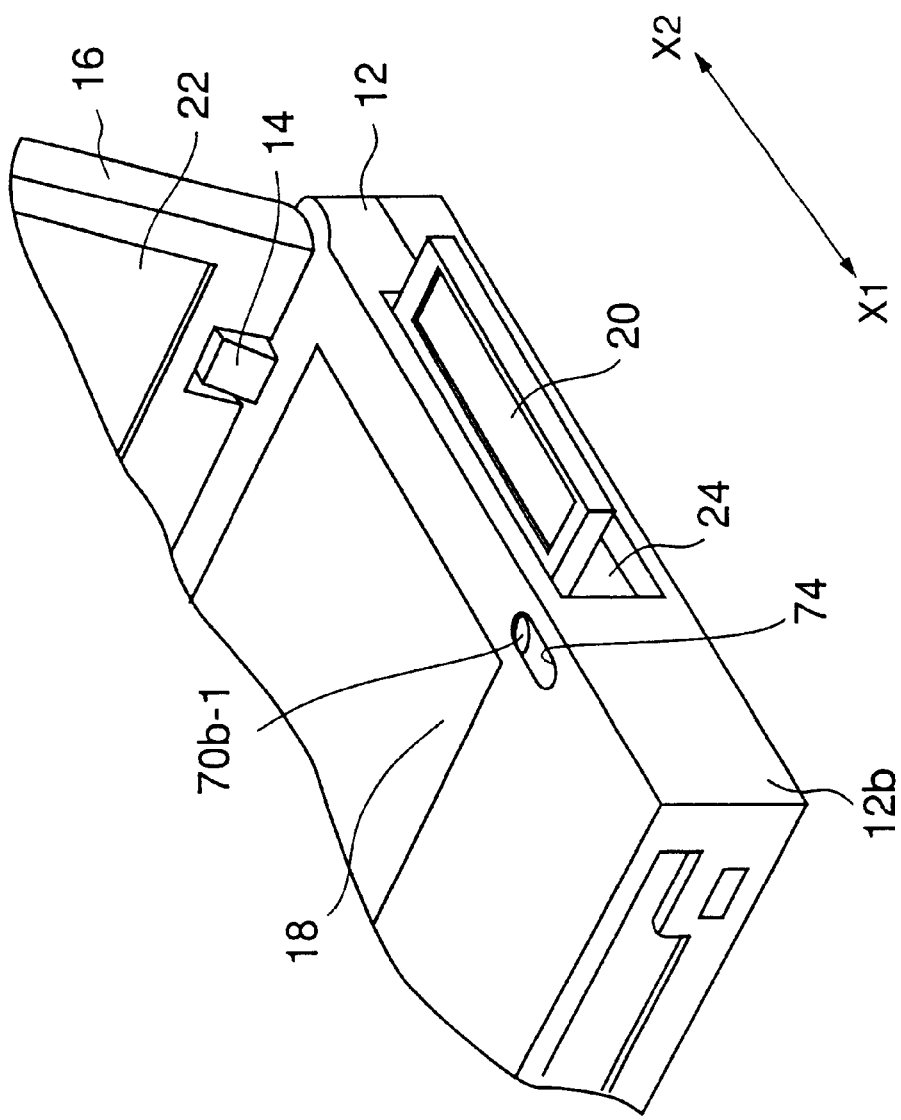
FIG. 10 is a diagram showing a partial cutaway perspective view of a portable electronic apparatus according to a third embodiment of the present invention, with the sub LCD in a raised position.
Figure 11:
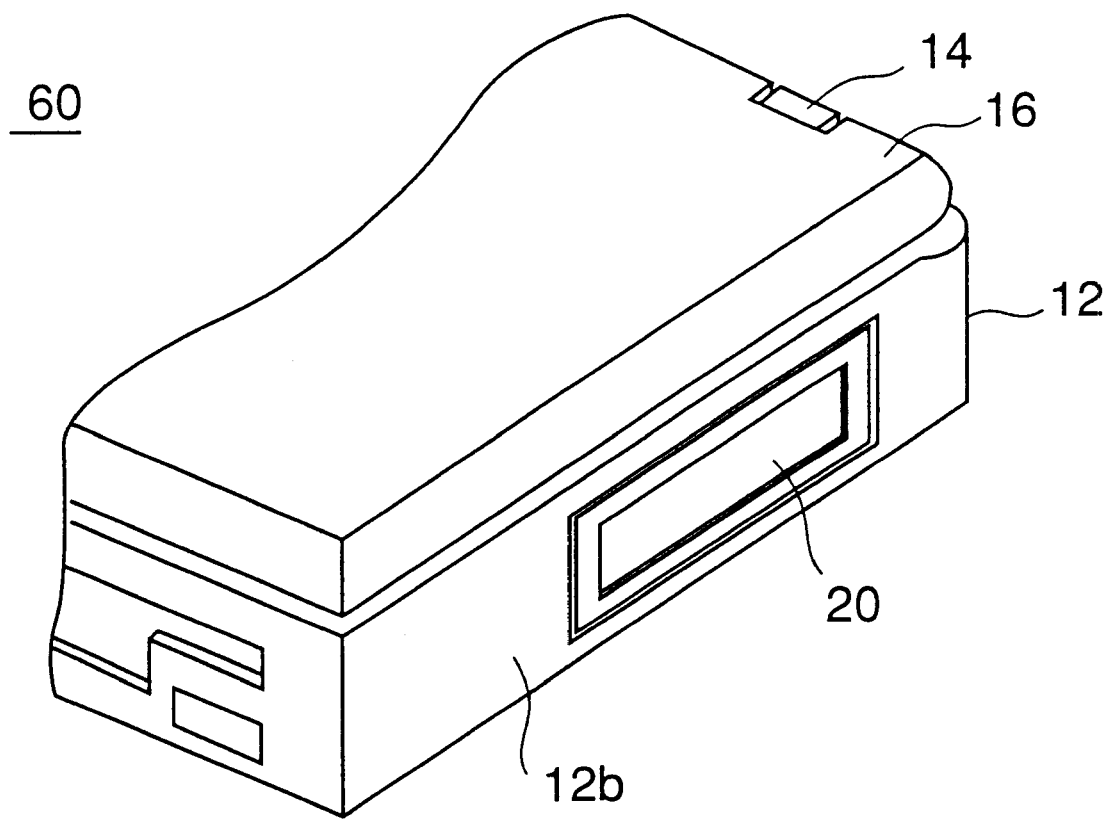
FIG. 11 is a diagram showing a partial cutaway perspective view of a electronic apparatus according to a third embodiment of the present invention, with the sub LCD in a raised position.
Figure 12:
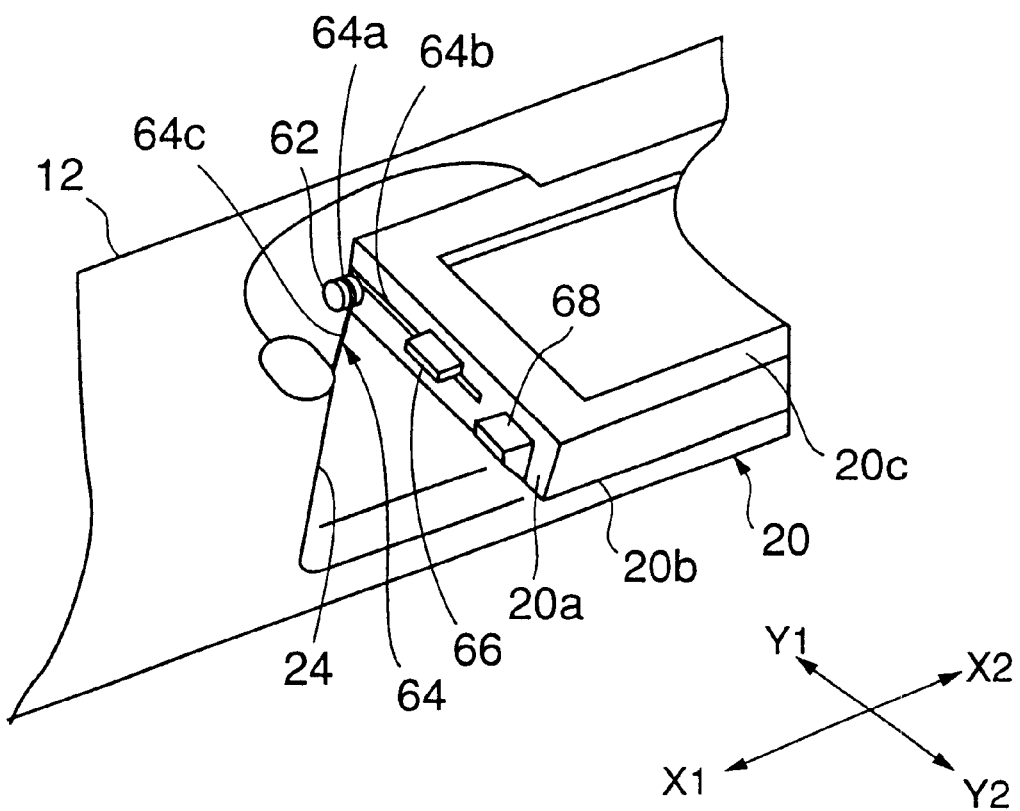
FIG. 12 is a diagram showing a partial cutaway perspective view of a portable electronic apparatus according to a third embodiment of the present invention, for the purpose of explaining an angle changing member of the sub LCD.
Figure 13A:
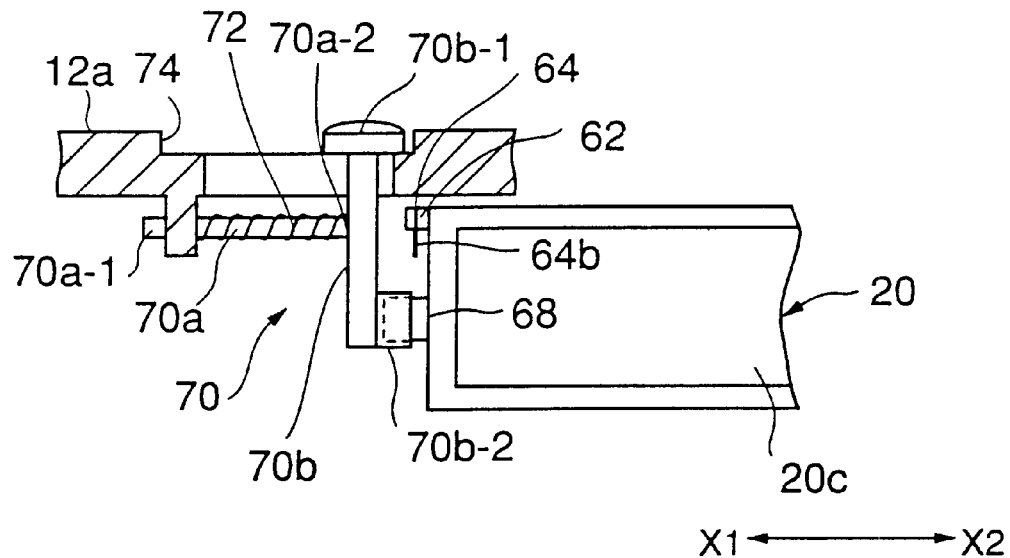
FIGS. 13A and 13B are diagrams showing partial cross-sectional side and perspective views, respectively, of a state in which the sub LCD of a portable electronic apparatus according to a third embodiment of the present invention is stored within a compartment in the main unit of the apparatus.
Figure 13B:
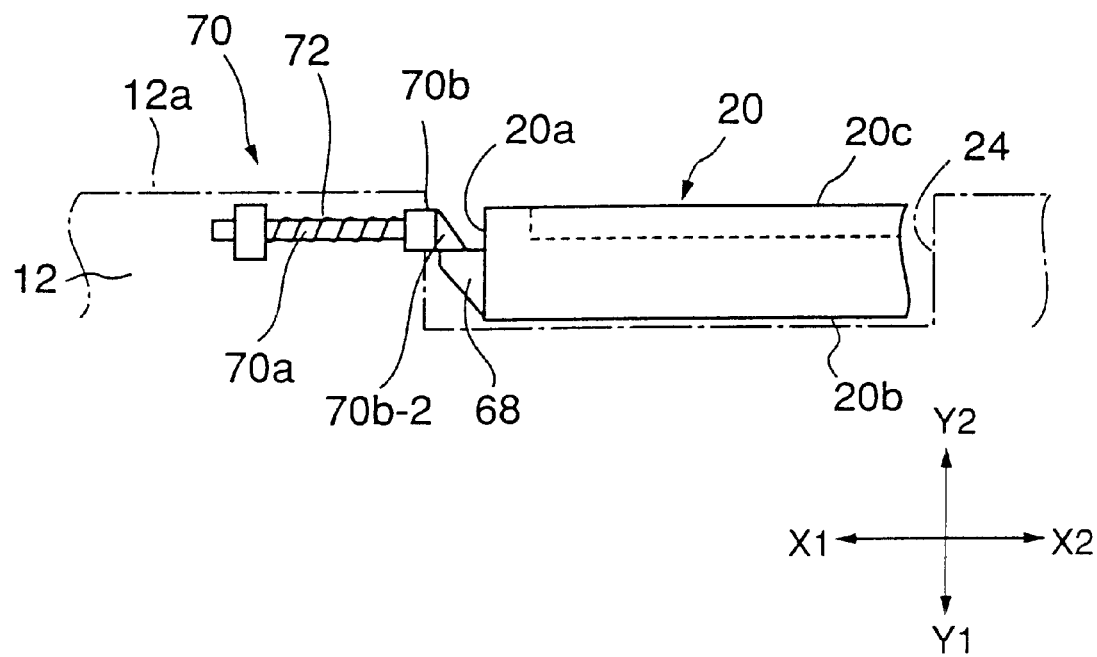

FIG. 10 is a diagram showing a partial cutaway perspective view of a portable electronic apparatus 60 according to a third embodiment of the present invention, with the sub LCD 20 in a raised position. FIG. 11 is a diagram showing a partial cutaway perspective view of a portable electronic apparatus 60 according to a third embodiment of the present invention, with the sub LCD 20 in a raised position. FIG. 12 is a diagram showing a partial cutaway perspective view of a portable electronic apparatus 60 according to a third embodiment of the present invention, for the purpose of explaining an angle changing member of the sub LCD 20. FIGS. 13A and 13B are diagrams showing partial cross-sectional side and perspective views, respectively, of a state in which the sub LCD 20 of a portable electronic apparatus 60 according to a third embodiment of the present invention is stored within a compartment 24 in the main unit 12 of the apparatus 60.

As shown in the diagrams, the portable electronic apparatus 60 has the sub LCD 20 provided on a right side surface 12b of the main unit 12. In a state in which the cover 16 is open as shown in FIG. 10, the sub LCD 20 is swung upward into a raised position so that the top surface 20c of the sub LCD 20 is horizontal. In a state in which the cover 16 is closed as shown in FIG. 11, the sub LCD 20 is stored within a concavity formed in the main unit 12.

A description will now be given of the sub LCD 20 angle changing mechanism of the portable electronic apparatus 60.

As shown in FIG. 12, a shaft 62 extends from an edge of the side 20a of the sub LCD 20. The shaft 62 is engaged and held in place by an aperture (not shown in the diagram) of the compartment 24 of the main unit 12. A coil portion 64a of a torsion spring 64, provided as an elastic member, caps the shaft 62. One end 64b of the torsion spring 64 engages a projection 66 extending from the side 20a of the sub LCD 20 and the other end 64c engages an aperture (not shown in the diagram) formed inside the compartment 24 in the main unit 12. Accordingly, the sub LCD 20 is constantly urged by the torsion spring 64 in a Y2 direction as shown in FIGS. 12 and 13B so as to rotate upward about the shaft 62. Additionally, a projection 68 is also formed at an edge of the side 20a of the sub LCD 20 opposite the edge described above. The projection 68 is gradually tapered so as to be narrow at a tip portion thereof and wide at a base portion thereof, as can be seen in FIG. 12 and in FIG. 13B.

As shown in FIGS. 10, 13A and 13B, a stopper member 70 is provided on the main unit 12. The stopper member 70 comprises a shaft portion 70a and a stopper portion 70b. One end 70a-1 of the horizontally disposed shaft portion 70a is fixedly mounted on the main unit 12 and the other end 70a-2 of the shaft 70a is fixedly mounted at an intermediate position along the vertically disposed stopper portion 70b. A coil spring 72 is wound around the shaft portion 70a of the stopper member 70. As a result, the stopper portion 70b is constantly urged by the coil spring 72 in the X2 direction. Additionally, a knob portion 70b-1 is formed on a top edge of the stopper portion 70b and projects from an aperture 74 on the top surface 12a of the main unit 12, the aperture 74 being elongated in an X1–X2 direction of FIGS. 10, 13A and 13B. Additionally, another projection 70b-2 is provided on a bottom edge of the stopper portion 70b in such a way as to extend in the X2 direction as shown in FIG. 13A. The projection 70b-2 is tapered so as to gradually narrow in a direction extending from the bottom surface 20b of the sub LCD 20 toward the top surface 20c of the sub LCD 20, as shown in FIG. 13B.

The shaft 62, the torsion spring 64 and the stopper member 70 described above together form the angle changing mechanism as described in the claims.

A description will now be given of the operation of the sub LCD 20 angle changing mechanism of a portable electronic apparatus 60 according to a third embodiment of the present invention.

When the sub LCD 20 is stored in the compartment 24, the cover 16 of the apparatus 60 is opened and the knob portion 70b-1 of the stopper portion 70b of the stopper member 70 is pulled forward in the X1 direction with a force exceeding an urging force of the coil spring 72, the engagement of the projection 70b-2 with the projection 68 is released and the sub LCD 20 is urged in the Y2 direction by the torsion spring 64 and rotates about the shaft 62, thus raising the sub LCD 20 to a horizontal position at which the top surface 20c can be easily read by the operator.

When the cover 16 of the apparatus 60 is to be closed, the sub LCD 20 angle changing mechanism need not be operated at all but, as circumstances require, the cover 16 may simply be shut and the sub LCD 20 left in a raised state. If on the other hand it is undesirable that the sub LCD 20 be left in a raised state, then the sub LCD 20 can be simply pushed in the Y1 direction and into the interior of the compartment 24, thus causing the projection 70b-2 to engage the projection 68 and thereby containing the sub LCD 20 inside the compartment 24.

The above-described portable electronic apparatus 60 according to a third embodiment of the present invention can provide the same advantages as the apparatus 10 according to a first embodiment of the present invention as described above. In particular, the sub LCD 20 is provided on the right side of the main unit 12, so no space is required for the sub LCD 20 on the top surface 12a of the main unit, where the keyboard 18 is located. Additionally, the sub LCD 20 display can be read even with the cover 16 of the main unit 12 closed. Moreover, storing the sub LCD 20 in the compartment 24 can be accomplished by the simple operation of pushing the sub LCD 20 into the compartment 24.

A description will now be given of a portable electronic apparatus according to a fourth embodiment of the present invention, with reference to the accompanying drawings, in particular FIGS. 14 and 15.

Figure 14:
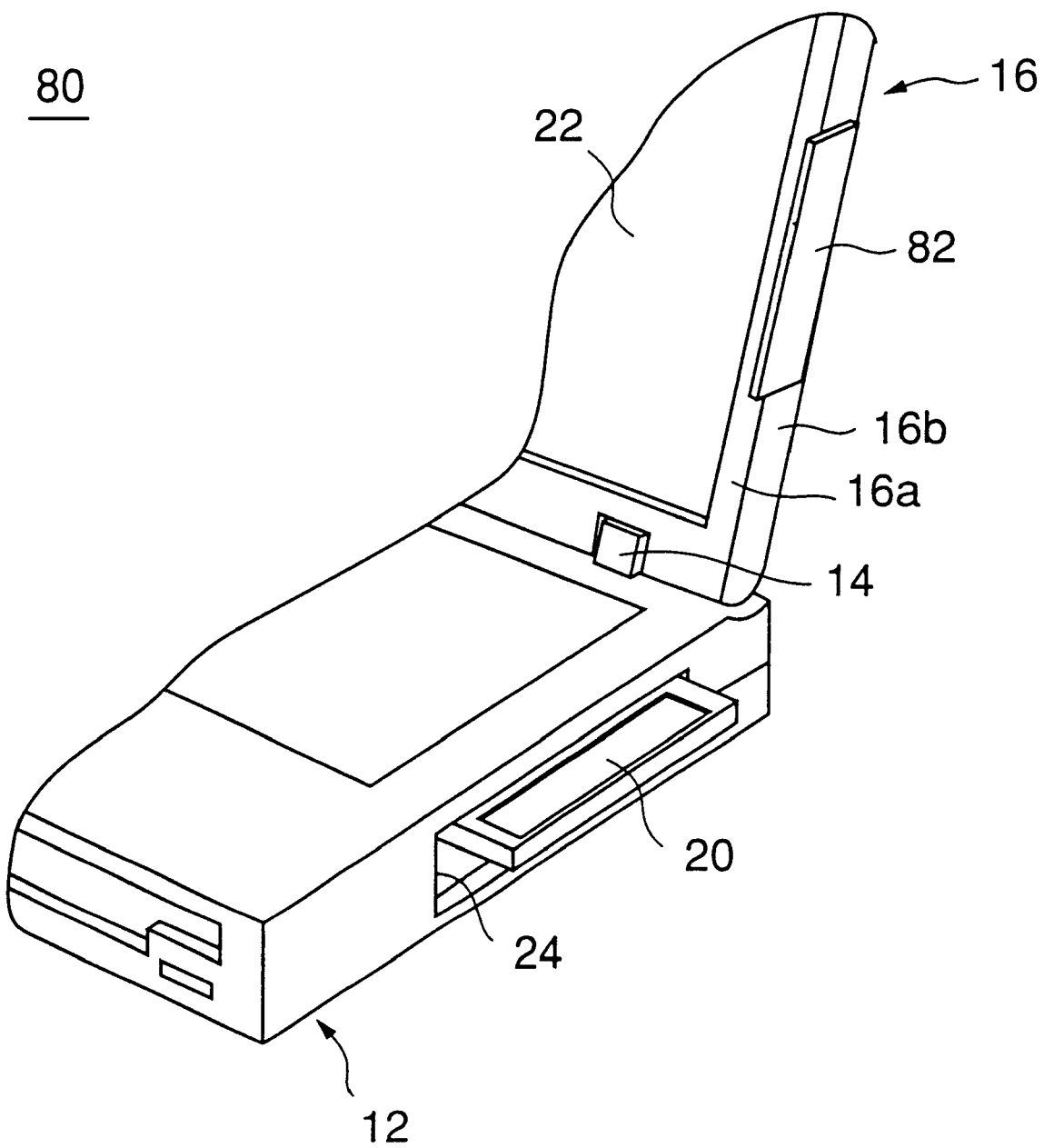
FIG. 14 is a diagram showing a partial cutaway perspective view of a portable electronic apparatus according to a fourth embodiment of the present invention, with the cover open and the sub LCD in a raised position.
Figure 15:
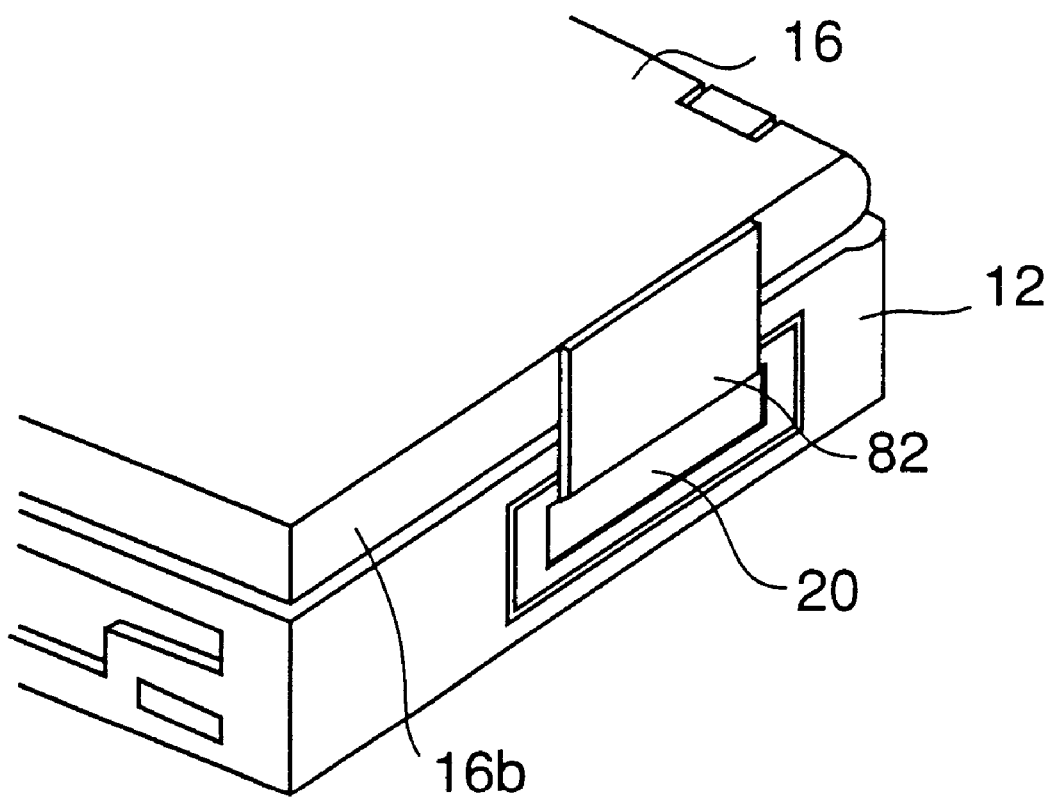
FIG. 15 is a diagram showing a partial cutaway perspective view of a portable electronic apparatus according to a fourth embodiment of the present invention, with the cover closed and the LCD stored in a compartment in the main unit.

FIG. 14 is a diagram showing a partial cutaway perspective view of a portable electronic apparatus 80 according to a fourth embodiment of the present invention, with the cover open and the sub LCD 20 in a raised position. FIG. 15 is a diagram showing a partial cutaway perspective view of a portable electronic apparatus 80 according to a fourth embodiment of the present invention, with the cover closed and the sub LCD 20 stored in a compartment 24 in the main unit 12.

As can be appreciated from the diagrams, the portable electronic apparatus 80 according to a fourth embodiment is substantially similar to the portable electronic apparatus 10. However, unlike the apparatus 10 of the first embodiment, the apparatus 80 of the fourth embodiment has a substantially rectangular projection 82 formed on a side surface of the cover 16 of the main unit 12.

In such a structure, when the cover 16 is closed, the projection 82 presses down on the top of the sub LCD 20, thus rotating the sub LCD 20 downward about the shaft 62 and storing the sub LCD 20 in the compartment 24 of the main unit 12. At the same time, when the cover 16 is opened the projection 82 is removed from the surface of the sub LCD 20, so the sub LCD 20 is urged by the torsion spring 64 and rotates outward and upward about the shaft 62 from the interior of the main unit 12.

The portable electronic apparatus 80 according to a fourth embodiment of the present invention, having a structure like that described above, provides the same advantages provided by the portable electronic apparatus 60 according to a third embodiment. At the same time, the structure of the angle changing mechanism can be made relatively simple. Additionally, the sub LCD 20 can be raised from or stored within the compartment 24 simply by opening and closing the cover 16.

It should be noted that together with or instead of the projection 82, an aperture may be formed in the top surface 12a of the main unit 12 that communicates with the compartment 24 and at the same time a projection may be formed that penetrates an aperture in the top surface 16a of the cover 16 and is capable of pressing down on the top surface 20c of the sub LCD 20.

A description will now be given of a portable electronic apparatus according to a fifth embodiment of the present invention, with reference to the accompanying drawings, specifically FIGS. 16 and 17.

Figure 16:
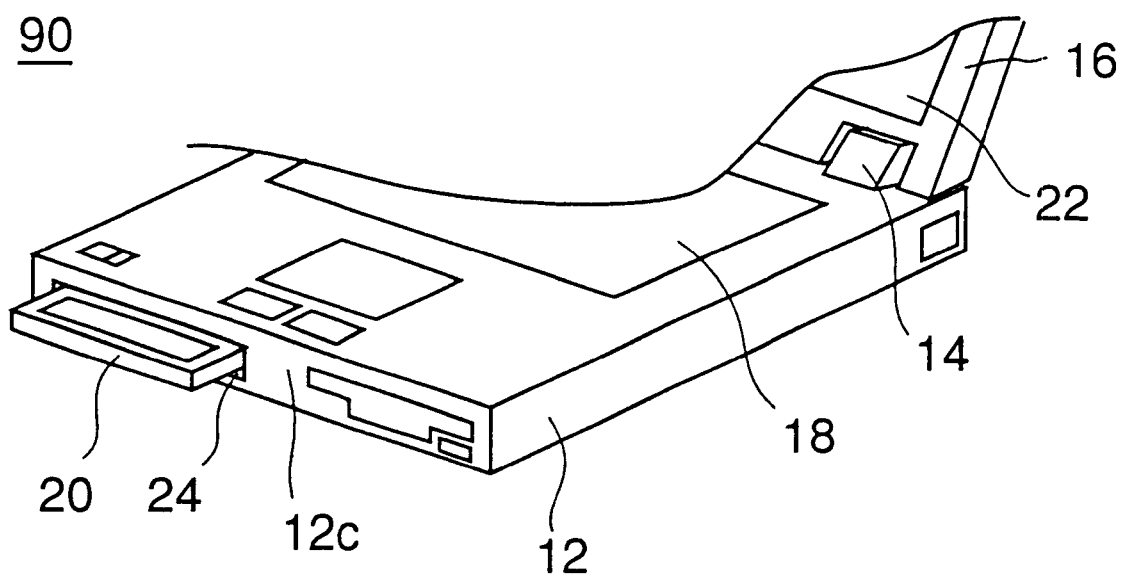
FIG. 16 is a diagram showing a partial cutaway perspective view of a portable electronic apparatus according to a fifth embodiment of the present invention, with the cover open and the sub LCD in a raised position.
Figure 17:
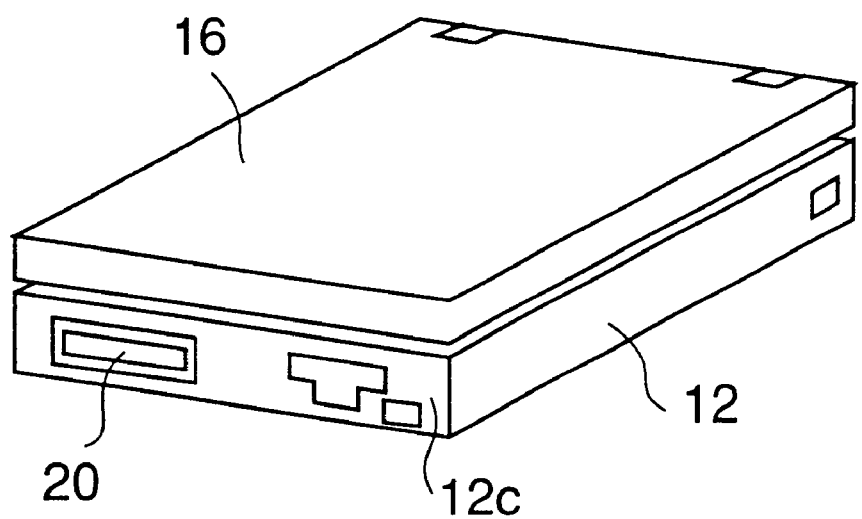
FIG. 17 is a diagram showing a partial cutaway perspective view of a portable electronic apparatus according to a fifth embodiment of the present invention, with the cover closed and the sub LCD stored within a compartment in the main unit.

FIG. 16 is a diagram showing a partial cutaway perspective view of a portable electronic apparatus 90 according to a fifth embodiment of the present invention, with the cover 16 open and the sub LCD 20 in a raised position. FIG. 17 is a diagram showing a partial cutaway perspective view of a portable electronic apparatus 90 according to a fifth embodiment of the present invention, with the cover 16 closed and the sub LCD 20 stored within a compartment 24 in the main unit 12.

As can be appreciated from the diagrams, the portable electronic apparatus 90 according to a fifth embodiment is substantially similar to the portable electronic apparatus 60 according to a third embodiment of the present invention. However, unlike the apparatus 60 of the third embodiment, the apparatus 90 of the fifth embodiment has the sub LCD 20 provided on a front edge surface 12c of the main unit 12.

The portable electronic apparatus 90 according to a fifth embodiment of the present invention, having a structure like that described above, provides the same advantages afforded by the portable electronic apparatus 60 according to a third embodiment, with the additional advantage that the sub LCD 20 can be seen close at hand.

A description will now be given of a variation of the angle changing mechanism using embodiments like the first and second embodiments described above, in which the sub LCD 20 is provided on the top surface 12a of the main unit 12, with reference to the accompanying drawings, specifically FIGS. 18, 19 and 20.

Figure 18:
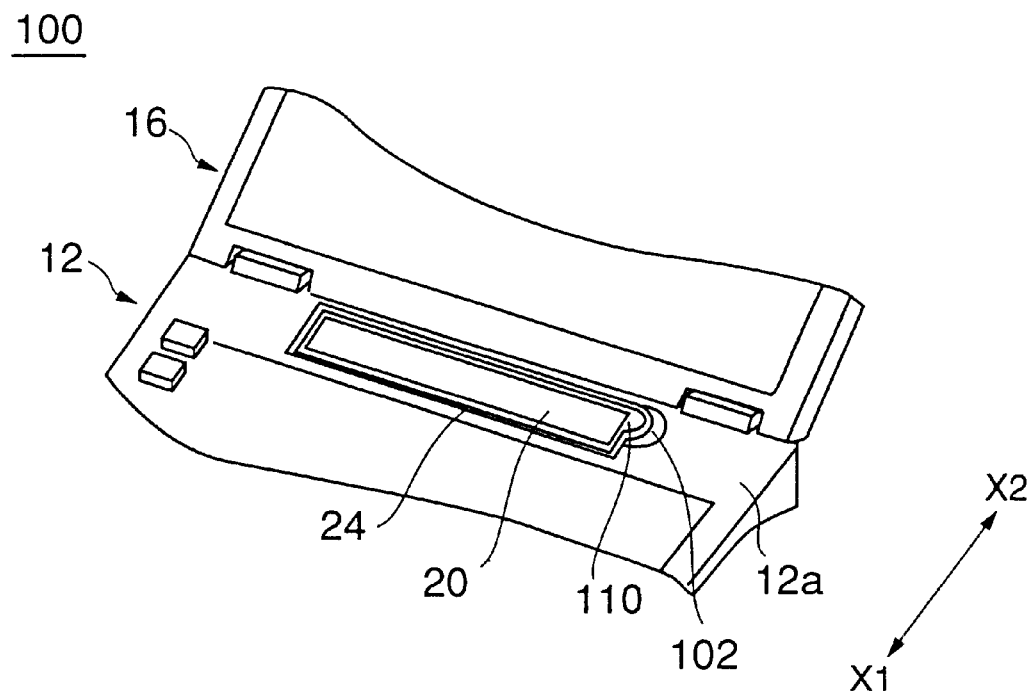
FIG. 18 is a diagram showing a partial cutaway perspective view of a portable electronic apparatus according to a variation of the present embodiment.

FIG. 18 is a diagram showing a partial cutaway perspective view of a portable electronic apparatus 100 according to a variation of the present embodiment. FIG. 19 is a diagram showing a partial cross-sectional view of a portable electronic apparatus 100 according to a variation of the present embodiment shown in FIG. 18. FIG. 20 is a diagram showing a partial cutaway perspective view of a portable electronic apparatus 100, for the purpose of explaining a raised state of the sub LCD 20.

As can be seen in the perspective view of FIG. 18, the sub LCD 20 is provided on the top surface 12a of the main unit 12 near the side at which the cover 16 is rotatably connected to the main unit 12, that is, near the X2 side of the top surface 12a of the main unit 12. The compartment 24 for the purpose of storing the sub LCD 20 is formed in the top surface 12a of the main unit 12. A projection 110 extends from the right side of the sub LCD 20 as shown in the diagram, with a concavity 102 formed in the surface 12a of the main unit 12 directly beneath the projection 110.

Figure 19:
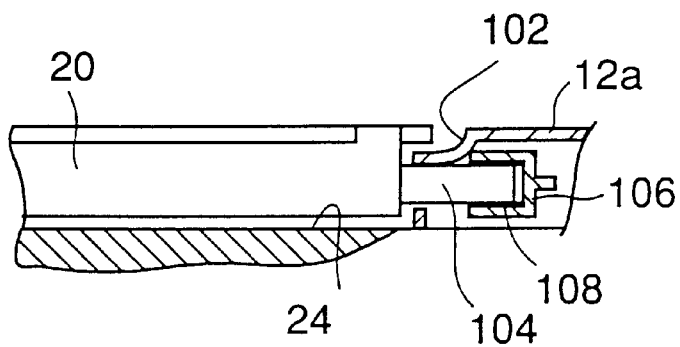
FIG. 19 is a diagram showing a partial cross-sectional view of a portable electronic apparatus according to a variation of the present embodiment shown in FIG. 18.
Figure 20:
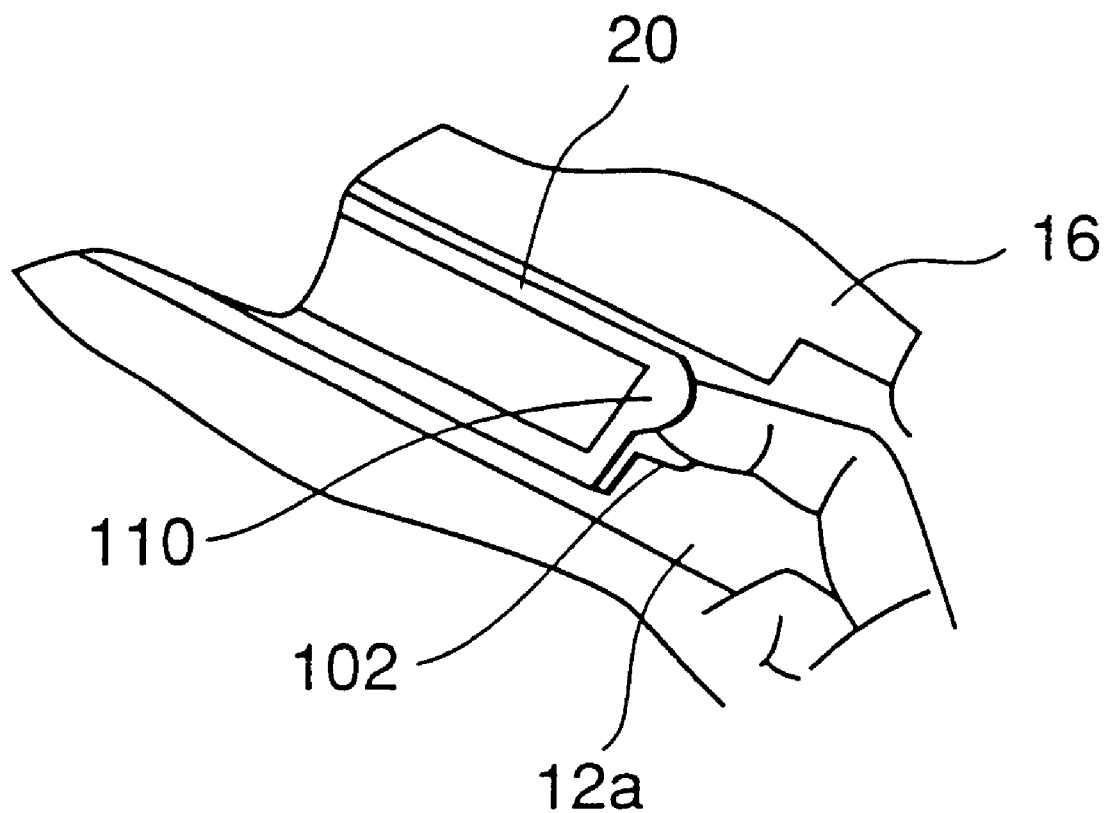
FIG. 20 is a diagram showing a partial cutaway perspective view of a portable electronic apparatus, for the purpose of explaining a raised state of the sub LCD.

As can be seen in the partial cross-sectional view of FIG. 19, a shaft 104 extends from the side of the sub LCD 20 on which the projection 110 described above is formed. The shaft 104 is seated on a bearing member 106 provided on the main unit 12. An elastic member 108 is provided between the shaft 104 and the bearing member 106.

Together, the shaft 104, the bearing member 106 and the elastic member 108 form the angle changing mechanism as described in the claims.

As shown in FIG. 18, in a state in which the sub LCD 20 is stored within the compartment 24, the operator slides a finger into the concavity 102 beneath the projection 110 and lifts upward on the projection 110 against the frictional force of the various parts of the angle changing mechanism, that is, the frictional torque of the shaft 104, thus raising the sub LCD 20. This variation provides the advantage of being able to maintain the sub LCD 20 at any desired angle and support the sub LCD 20 in that state.

If the angle changing mechanism is such as to be able to raise the shaft to a predetermined angle and maintain the shaft at that predetermined angle like the variation described above, then such an angle changing mechanism can make wide use of a variety of desired structures other than and in addition to those referenced in the foregoing descriptions of the first, second, third, fourth and fifth embodiments described above. For example, such an angle changing mechanism structure may comprise a shaft and a shaft bearing made of flexible material, with a shallow concavity and convexity that slidingly engage each other and so can raise the sub LCD into position with a click.

It should be noted that although the foregoing description refers to an LCD, in fact the present invention can be adapted for use with any other suitable display unit, such as, for example, a plasma display unit.

The above description is provided in order to enable any person skilled in the art to make and use the invention and sets forth the best mode contemplated by the inventor of carrying out the invention.

The present invention is not limited to the specifically disclosed embodiments, and variations and modifications may be made without departing from the scope and spirit of the present invention.

The present application is based on Japanese Priority Application No. 11-297400, filed on Oct. 19, 1999, the entire contents of which are hereby incorporated by reference.

What is claimed is:

1. A portable electronic apparatus comprising:
   a main unit;
   a cover rotatably attached to the main unit, the cover having a main display unit;
   an auxiliary display unit provided on the main unit; and
   an angle changing mechanism for changing an angle at which a surface of the auxiliary display unit intersects a surface of the main unit at least when the cover is in an open state.

2. The portable electronic apparatus as claimed in claim 1, wherein the angle changing mechanism rotatably links the auxiliary display unit to the main unit.

3. The portable electronic apparatus as claimed in claim 1, wherein the main unit comprises a compartment for containing the auxiliary display unit at least when the cover is in a closed state.

4. The portable electronic apparatus as claimed in claim 3, wherein the angle changing mechanism is capable of changing the angle of the surface of the auxiliary display unit between a position in which the auxiliary display unit is stored within the main unit and a position in which the auxiliary display unit is raised with respect to the compartment.

5. The portable electronic apparatus as claimed in claim 3, wherein the angle changing mechanism comprises an urging member urging the auxiliary display unit from the position in which the auxiliary display unit is stored within the main unit and the position in which the auxiliary display unit is raised with respect to the compartment for containing the auxiliary display unit.

6. The portable electronic apparatus as claimed in claim 1, wherein the main unit has an input member.

7. The portable electronic apparatus as claimed in claim 6, wherein the auxiliary display unit is provided on a surface of the main unit on which the input member is provided, near the side of the main unit at which the cover is rotatably connected to the main unit.

8. The portable electronic apparatus as claimed in claim 1, wherein the auxiliary display unit is provided at a front side of the main unit nearest an operator of the apparatus.

9. The portable electronic apparatus as claimed in claim 1, wherein the auxiliary display unit is provided on at least one of two sides of the main unit sandwiching the front side of the main unit nearest the operator of the apparatus.

10. The portable electronic apparatus as claimed in claim 9, wherein a projection is provided on the cover in such a way as to press down on and close the auxiliary display unit when the cover is closed, thereby storing the auxiliary display unit within the compartment in the main unit.

11. The portable electronic apparatus as claimed in claim 6, wherein:
   the auxiliary display unit is provided on a surface of the main unit on which the input member is provided, near the side of the main unit at which the cover is rotatably connected to the main unit;
   a projection is formed so as to extend from at least one side of the auxiliary display unit; and
   a concavity is formed in the surface of the main unit directly beneath the projection.

* * * * *